United States Patent
Wang et al.

(10) Patent No.: US 12,309,538 B2
(45) Date of Patent: May 20, 2025

(54) METHOD AND APPARATUS FOR OPTIMIZING OTN NETWORK RESOURCES, COMPUTER DEVICE AND STORAGE MEDIUM

(71) Applicant: ZTE CORPORATION, Guangdong (CN)

(72) Inventors: Dajiang Wang, Guangdong (CN); Youdao Ye, Guangdong (CN); Zhenyu Wang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 138 days.

(21) Appl. No.: 18/023,348

(22) PCT Filed: Aug. 9, 2021

(86) PCT No.: PCT/CN2021/111489
§ 371 (c)(1),
(2) Date: Feb. 25, 2023

(87) PCT Pub. No.: WO2022/042276
PCT Pub. Date: Mar. 3, 2022

(65) Prior Publication Data
US 2023/0319446 A1   Oct. 5, 2023

(30) Foreign Application Priority Data
Aug. 31, 2020   (CN) .......................... 202010899110.1

(51) Int. Cl.
*H04Q 11/00* (2006.01)
(52) U.S. Cl.
CPC ............................... *H04Q 11/0067* (2013.01)

(58) Field of Classification Search
CPC .................................................. H04Q 11/0067
See application file for complete search history.

(56) References Cited

U.S. PATENT DOCUMENTS 11,126,929 B2 * 9/2021 Janulewicz .............. G06N 7/01
2021/0099378 A1 * 4/2021 Alaettinoglu ........... H04L 45/70

OTHER PUBLICATIONS

Chen, "DeepRMSA: A Deep Reinforcement Learning Framework for Routing, Modulation and Spectrum Assignment in Elastic Optical Networks", Journal of Lightwave Technology, vol. 37, No. 16, Aug. 2019 (Year: 2019).*

(Continued)

*Primary Examiner* — Pranesh K Barua
(74) *Attorney, Agent, or Firm* — Li & Cai Intellectual Property (USA) Office (57) ABSTRACT

The present disclosure provides a method for optimizing OTN network resources, including: determining and creating a service to be created in a current service creating state according to an action policy, calculating a timely reward, entering a next service creating state, until an Episode is finished, calculating a comprehensive optimization parameter according to the timely reward, and calculating and updating a quantization index weight vector according to the comprehensive optimization parameter, where the action policy is a probability function related to the quantization index weight vector, and the quantization index weight vector corresponds to a plurality of quantization indexes; iterating a preset number of Episodes to obtain an optimized quantization index weight vector; and updating the action policy according to the optimized quantization index weight vector. The present disclosure further provides an apparatus for optimizing OTN network resources, a computer device, and a computer-readable storage medium.

18 Claims, 3 Drawing Sheets

```
Determining a service to be created in a current service creating state according to
an action policy, creating the service to be created, calculating a timely reward in      S11
the current service creating state, entering a next service creating state, until an
Episode is finished, calculating a comprehensive optimization parameter in each
service creating state according to the timely reward in each service creating state,
and calculating and updating a quantization index weight vector according to the
comprehensive optimization parameter in each service creating state ▼
Iterating a preset number of Episodes to obtain an optimized quantization index          S12
                                  weight vector ▼
Updating the action policy according to the optimized quantization index weight          S13
                                     vector
```

(56) References Cited

OTHER PUBLICATIONS

Suarez-Varela, "Routing in optical networks with deep reinforcement learning", Journal of Optical Communications and Networking, vol. 11, No. 11, Nov. 2019 (Year: 2019).*

* cited by examiner

FIG. 1

```
Determining a service to be created in a current service creating state according to
an action policy, creating the service to be created, calculating a timely reward in
  the current service creating state, entering a next service creating state, until an
  Episode is finished, calculating a comprehensive optimization parameter in each
service creating state according to the timely reward in each service creating state,
  and calculating and updating a quantization index weight vector according to the
         comprehensive optimization parameter in each service creating state
```
S11

```
      Iterating a preset number of Episodes to obtain an optimized quantization index
                                       weight vector
```
S12

```
       Updating the action policy according to the optimized quantization index weight
                                           vector
```
S13

METHOD AND APPARATUS FOR OPTIMIZING OTN NETWORK RESOURCES, COMPUTER DEVICE AND STORAGE MEDIUM

CROSS-REFERENCE TO RELATED APPLICATIONS

The present application claims the priority of Chinese Patent Application No. 202010899110.1, filed on Aug. 31, 2020, the contents of which are incorporated herein in their entirety by reference.

TECHNICAL FIELD

The present disclosure relates to the field of automatic control technology, and in particular, to a method for optimizing OTN network resources, an apparatus for optimizing OTN network resources, a computer device, and a computer-readable storage medium.

BACKGROUND

With developments of artificial intelligence technologies, an application of reinforcement learning technology getting more and more attention from various fields and industries. The reinforcement learning (also referred to as evaluation learning), is an important machine learning method and has many applications in fields of intelligent control robots, network analysis and prediction and the like. In a school of machine learning of connectionism, learning algorithms are classified into three types, i.e., unsupervised learning, supervised learning, and reinforcement learning.

The reinforcement learning is learning by an Agent in a way of "trial and error", is a reward-guidance action obtained by interacting with environment and aims to enable the Agent to obtain maximum reward, the reinforcement learning is different from the supervised learning in connectionism learning mainly in a reinforcement signal, in the reinforcement learning, the reinforcement signal provided by the environment is an evaluation (generally is a scalar signal) on a quality of a generated action, instead of telling a reinforcement learning system (RLS) how to generate a correct action. Since little information is provided by external environment, the RLS must learn from its own experiences, in such way, the RLS gains knowledge in action-evaluation environment and improves an action scheme to adapt to the environment.

In recent years, with applications and popularization of reinforcement learning technology, how to apply advantages of the technology to the field of intelligent management and control, and operation and maintenance of an optical transport network (OTN), and in particular, an application of reinforcement learning in optimizing OTN network resources, has received wide attention from experts in the field relating to the ONT.

SUMMARY

In an aspect, the present disclosure provides a method for optimizing OTN network resources, including: determining a service to be created in a current service creating state according to an action policy, creating the service to be created, calculating a timely reward in the current service creating state, entering a next service creating state, until an Episode is finished, calculating a comprehensive optimization parameter in each service creating state according to the timely reward in each service creating state, and calculating and updating a quantization index weight vector according to the comprehensive optimization parameter in each service creating state, where the action policy is a probability function related to the quantization index weight vector, and the quantization index weight vector corresponds to a plurality of quantization indexes; iterating a preset number of Episodes to obtain an optimal/desired/resultant quantization index weight vector; and updating the action policy according to the optimal/desired/resultant quantization index weight vector.

In an aspect, the present disclosure further provides an apparatus for optimizing OTN network resources, including a first processing module, a second processing module and an updating module, the first processing module is configured to determine a service to be created in a current service creating state according to an action policy, create the service to be created, calculate a timely reward in the current service creating state, enter a next service creating state, until an Episode is finished, calculate a comprehensive optimization parameter in each service creating state according to the timely reward in each service creating state, and calculate and update a quantization index weight vector according to the comprehensive optimization parameters in each service creating state, where the action policy is a probability function related to the quantization index weight vector, and the quantization index weight vector corresponds to a plurality of quantization indexes; the second processing module is configured to iterate a preset number of Episodes to obtain an optimal/desired/resultant quantization index weight vector; the updating module is configured to update the action policy according to the optimal/desired/resultant quantization index weight vector.

In an aspect, the present disclosure further provides a computer device, including; at least one processor; a storage device having at least one program stored thereon; the at least one program, when executed by the at least one processor, causes the at least one processor to perform the method described above.

In an aspect, the present disclosure further provides a computer-readable storage medium, having a computer program stored thereon, the computer program, when executed by a processor, causes the processor to perform the method described above.

DETAILED DESCRIPTION

Exemplary implementations are described in detail below with reference to the accompanying drawings, but may be implemented in different forms, and should not be construed as a limitation. The purpose of providing these implementations is to make the present disclosure more thorough and complete, and to enable those skilled in the art to fully understand the scope of the present disclosure.

As used herein, a term "and/or" includes any and all combinations of one or more of listed items.

The terms used in the present disclosure are for a purpose of describing particular implementations only, but are not intended to limit the present disclosure. As used in the present disclosure, singular forms "a" and "the" are intended to include plural forms as well, i.e., to represent at least one, unless the context clearly defines otherwise. It should further be understood that terms "includes/comprises" and/or "made of/formed of" in the present disclosure are used to specify a presence of at least one of recited features, integers, steps, operations, elements or components, but do not preclude a presence or an addition of at least one of other features, integers, steps, operations, elements, components or groups thereof.

Implementations of the present disclosure may be described with reference to plan and/or cross-sectional views with the help of idealized schematic illustrations of the present disclosure. Therefore, the example illustrations may be modified in accordance with manufacturing techniques and/or tolerances. Implementations of the present disclosure are not limited to those shown in the accompanying drawings, but include modifications of any configuration formed based on a manufacturing process. Therefore, areas illustrated in the accompanying drawings are provided with schematic properties, and shapes of the areas illustrated in the accompanying drawings illustrate specific shapes of the areas of elements, but are not limiting.

Unless otherwise defined, meanings of all terms (including technical terms and scientific terms) used herein are the same as meanings commonly understood by one of ordinary skill in the art. It should further be understood that terms, such as those defined in common dictionaries, should be construed as having a meaning that is consistent with that in background of the existing art and the present disclosure, and should not be construed as having an idealized or over-formal meaning, unless expressly defined in the present disclosure.

Figure 1:
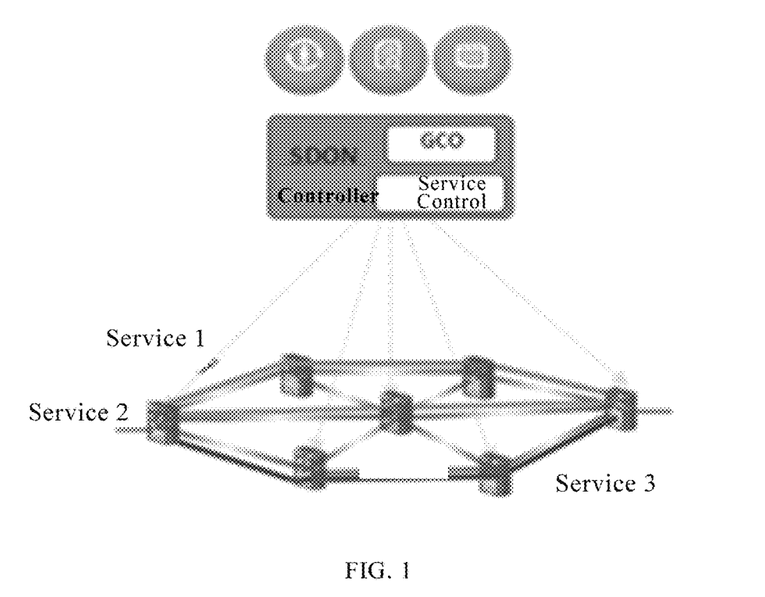
FIG. 1 is a schematic diagram of optimizing OTN network resources under an SDON architecture according to the present disclosure.

An OTN global co-current optimization (GCO) scheme based on an architecture of software defined optical network (SDON) is shown in FIG. 1, and a main purpose of the GCO is, in a process of allocating OTN network resources, for planning or creating OTN network services in batch, to make routes and a sum of occupied resources obtained by each service through calculating maximally meet an optimization target of a user (a network service operator) for allocating overall preset resources to the network services, without any obstruction for calculating the routes and allocating the resources for each service. With the OTN GCO technology, an operation and maintenance cost (CAPEX (capital expenditure)/OPEX (operating expense)) of the user can be reduced to a maximum extent, an operation and maintenance income is improved, and transmission performance and quality are optimized, which are directly related to an economic benefit of network operation of the user, so that the technology obtains a high attention of the user, and there is a great significance on how to realize the OTN GCO technology.

In a deployment of OTN network services, corresponding OTN network resources (such as bandwidth, spectrum, wavelength, modulation format, and route) are usually allocated to each service according to operation expectations, and resource optimization for each entire service under a specified optimization policy is desired to be satisfied, the optimization policy includes shortest delay of the entire service, minimum routing cost, and the like. Moreover, from perspectives of maximizing operation income, optimizing service performance, minimizing investment of CAPEX/OPEX and the like, an operation of each OTN network service is desired to meet an overall optimization of the OTN network service on usage of network resources under a preset optimization policy, and the optimization includes, for example, a minimum delay of the OTN network service, a minimum routing cost of the OTN network, or a maximum utilization rate of bandwidth of the OTN network service. Therefore, in a process of creating the OTN network service, not only optimization of resources of the OTN network service is desired to be satisfied, but also a global optimization on usage of the OTN network resources by services is desired to be satisfied by arranging a sequence of creating of the services.

A process of creating the OTN network services usually adopts a concurrent creation mode, i.e., a plurality of services are centrally created in batch at a certain time, the process of creating the OTN network services actually determines a sequence of creating all the services, and the sequence of creating the OTN network services determines an occupation mode of the OTN network resources and an optimization state of allocating the OTN network resources. The sequence of creating the OTN network services is called as a policy for creating and arranging services (i.e., an action policy), and a good policy for creating and arranging services can meet the optimization policy for the OTN network services utilizing the OTN network resources.

However, in actual allocation and usage of OTN network resources, a consideration on optimizing network resources is often multidimensional, and if only optimization for quantitative indexes of network resources in a certain dimension is considered, usage and optimization of other quantitative indexes are to be affected. Therefore, it is desired to comprehensively optimize a plurality of quantitative indexes of the network resources to obtain an optimized/desired combination mode of the plurality of quantitative indexes. In such process, not only a global optimization for a single quantitative index is desired to be ensured as much as possible, but also a comprehensive global optimization for all quantitative indexes of the OTN network resources is desired to be ensured, so that a maximum utilization of the OTN network resources, a maximum benefit and a maximum optimization for transmission performance are ensured.

Based on the above problems, a parameter vector θ is introduced into a design of the action policy of reinforcement learning, an optimized/desired action policy is to be obtained by continuously improving θ, so that a purpose of comprehensively globally optimizing the OTN network resources with a plurality of indexes is achieved. In an OTN network, common quantization indexes include cost, delay, bit error rate (BER), Q-value margin, spectrum efficiency, hop count, spectrum width, transmission rate, and the like, and as desired by the user, all the common quantization indexes may be considered as quantization indexes for comprehensively globally optimizing the OTN network resources with the plurality of indexes.

In an initialization stage, n OTN network services are created according to environmental conditions of a topology structure (including mesh, star, and other structure types) of the OTN network, and a network environment state, an action space, a target policy for optimizing actions, and the action policy are initialized. Parameters related to an algorithm of reinforcement learning are defined as follows.

First, an objective function for optimizing a comprehensive index of the OTN network is defined.

The objective function for optimizing the comprehensive index of the OTN network may be a maximum reward $w_i$ for a comprehensive quantization index of resources occupied by the OTN network, i.e., $$Obj_{Max} \leftarrow \max[\sum_{i=1}^{m} w_i].$$

Second, an eigenvector of a service creating state S is defined.

An eigenvector $\phi(s)$ is used to describe the service creating state, and indicate which services have been created and which services have not been created, and in response to that a service to be created is created, a next service creating state is entered.

The eigenvector $\phi(s)$ of the service creating state S is described as follows:

{StateID; SvcNum; . . . SvcID$_i$; SvcCost$_i$; SvcDelay$_i$; SvcQR$_i$; SvcFB$_i$; . . . SvcIndexh$_i$; SvcSeqID$_i$; SvcRtID$_i$; SrcNdID$_i$; DstNdID$_i$; . . .};

StateID is an identifier (ID) of the service creating state;

SvcNum is a total number of all OTN network services, i.e., a sum of a number of created services and a number of services to be created;

a group of attribute sequences of the service creating state of an i-th service in the network are represented by following eigenvector elements, front and rear ellipses represent attribute sequences of the service creating state of first i-1 services and last n-i services which are defined in a same mode, and middle ellipsis indicates omitted and optimized quantization indexes of the i-th service, SvcID$_i$ is a service ID of the i-th service;

SvcCost$_i$ is a routing cost of the i-th service, and if the service is not created, the routing cost is 0;

SvcDelay$_i$ is a delay of the i-th service, and if the service is not created, the delay is 0;

SvcQR$_i$ is a Q-value margin of the i-th service, and if the service is not created, the Q-value margin is 0;

SvcFB$_i$ is a spectrum width occupied by the i-th service, and if the service is not created, the spectrum width is 0;

SvcIndexh$_i$ is an h-th optimized quantization index of the i-th service, and if the service is not created, the quantization index is 0;

SvcSeqID$_i$ is a sequence ID of the i-th service in the OTN network services, and if the service is not created, the sequence ID of the service is 0;

SvcRtID$_i$ is a route ID occupied by the i-th service, and if the service is not created, the route ID of the service is 0;

SrcNdID$_i$ is a source node ID of the i-th service;

DstNdID$_i$ is a destination node ID of the i-th service.

Third, an Episode is defined.

Completing sequential creations of the OTN network services by adopting a certain action policy is defined as an Episode.

Fourth, an action $a_t$, and an action policy are defined.

An action refers to a process that, in a current network topology environment state, a service to be created is selected from services to be created as a next created service, and one of a plurality of alternative routes (routes to which network resources are already allocated) of the service to be created is selected as a resource route of the service, and the service is created. The plurality of alternative routes of the service to be created may be obtained through calculating by adopting a KSP (k-shortest path algorithm), a RWA (routing and wavelength assignment algorithm), and an RSA (asymmetric cryptographic algorithm), and by allocating with corresponding network resources, and each single alternative route meets an expectation defined by a threshold of each quantitation index.

The action policy $\pi_\theta(s,a)$ represents a sequence of creating the services to be created (including the route of the service to be created), and is a probability function related to a quantization index weight vector $\theta$ and is used for reflecting a degree of comprehensively globally optimizing the OTN network resources with the plurality of indexes, an evaluation of the comprehensive index of OTN network services is represented by adopting a mode of scoring the comprehensive quantization index, and the higher the score of the comprehensive quantization index is, the higher the degree of comprehensively globally optimizing the OTN network resources with the plurality of indexes is.

Fifth, quantization indexes are defined.

The quantization indexes include a first class of quantization indexes, a second class of quantization indexes and a third class of quantization indexes, values of the first class of quantization indexes are inversely proportional to scores of the first class of quantization indexes, a relationship between the values index$_{ijk}$ and the scores $w_{ijh1}$ of the quantization indexes is represented in a form of a reciprocal sum; values of the second class of quantization indexes are inversely proportional to scores of the second class of quantization indexes, scores of the third class of quantization indexes are obtained after creating a last service in each Episode.

The score $w_{ij}$ of the comprehensive quantization index is a sum of a sum $w_{ijh1}$ of the scores of the first class of quantization indexes, a sum $w_{ijh2}$ of the scores of the second class of quantization indexes and a sum $w_{ijh3}$ the scores of the third class of quantization indexes, i.e., $w_{ij}=w_{ijh1}+w_{ijh2}+w_{ijh3}$, h1 is a number of the first class of quantization indexes, h2 is a number of the second class of quantization indexes, h3 is a number of the third class of quantization indexes.

Sixth, an evaluation system for evaluating a quantitation index is defined.

The present disclosure defines different action policies $\pi\theta(s,a)$ for different evaluation systems for evaluating the quantitation index, which are respectively described below.

In a first case, all services share a same evaluation system for evaluating the quantitation index.

A number of services, to be created, of the OTN network is set to be m, the whole evaluation system for evaluating the quantitation index is represented by a quantitation index weight vector $\theta$, $\theta=(\theta_1,\theta_2,\ldots,\theta_h)$, h is a total number of quantitation indexes, h=h1+h2+h3.

A threshold of the comprehensive quantitation index of the OTN network is defined as follows: index$_{threshold}$=(index$_{1threshold}$,index$_{2threshold}$, . . . index$_{hthreshold}$)

The score of the quantitation index of each alternative route of each service may be divided into three cases according to a classification of quantitation indexes:

a. in a case where a value index$_{ijk}$ of the quantization index is inversely proportional to a score $w_{ijh1}$ of the quantization index, a relationship between the value index$_{ijk}$ of the quantization index and the score w$_{ijh1}$ of the quantization index is represented in a form of a reciprocal sum:

$$w_{ijh1} = \sum_{k=1}^{h1} \frac{\frac{1}{\text{index}_{ijk}}}{\text{index}_{kthreshold}} \cdot \theta_k,$$

index$_{ijk}$ is a k-th quantization index of a j-th alternative resource route of an i-th service, index$_{kthreshold}$ is a threshold of the k-th quantization index, the smaller the value index$_{ijk}$ of the first class of quantization index is, the higher the score w$_{ijh1}$ of the first class of quantization index corresponding to the alternative route is;

b. in a case where the value index$_{ijk}$ of the quantization index is proportional to the score w$_{ijh2}$ of the quantization index, a relationship between the value index$_{ijk}$ of the quantization index and the score w$_{ijh2}$ of the quantization index may be represented as:

$$w_{ijh2} = \sum_{k=h1+1}^{h1+1+h2} \frac{\text{index}_{ijk}}{\text{index}_{kthreshold}} \cdot \theta_k;$$

c. only in a case where the i-th service is the last created service in an Episode, the value index$_{ijk}$ of the quantization index of the score w$_{ijh3}$ is obtained, a relationship between the value index$_{ijk}$ and the score w$_{ijh3}$ may be represented as:

$$w_{ijh3} = \sum_{k=h1+h2+1}^{h1+h2+1+h3} \{[!(m-i)] \cdot f(\text{index}_{ijk}, \text{index}_{kthreshold}) \cdot \theta_k\},$$

index$_{ijk}$ is the k-th quantization index of the j-th alternative resource route of the i-th service, index$_{kthreshold}$ is a threshold of the k-th quantization index, !(m-i) is a logic non-operation of (m-i), f(index$_{ijk}$,index$_{kthreshold}$)·$\theta_k$ is an index scoring function of the k-th quantization index of the j-th alternative resource route of the i-th service, and is expected to be proportional to an optimization degree of the quantitation index.

A greed coefficient of the j-th alternative resource route of the i-th service is $$\xi_{ij} = \frac{w_{ij}}{\sum_{j=1}^{i_n} w_{ij}},$$

i$_n$ is a number of alternative routes of the i-th service.

A number of created services in the service creating state S$_t$ is set as t, a probability of selecting a service to be created is $$\frac{1}{m-t},$$

m is a total number of services to be created in the OTN network, a probability of selecting each service to be created is $$\frac{1}{m-t},$$

and an action policy $\pi_\theta$(s,a) of each alternative route is $$\frac{\xi_{ij}}{m-t}.$$

In a second case, each service has its own evaluation system for evaluating a quantitation index.

A number of services, to be created, of the OTN network is set to be m, the whole evaluation system for evaluating the quantitation index is represented by an index weight vector$\theta$, $\theta=(\theta_1,\theta_2, \ldots \theta_m)$, an index parameter vector of the i-th service may be defined as $\theta_i=(\theta_{i1},\theta_{i2}, \ldots, \theta_{ih})$, h is a total number of quantitation indexes, h=h1+h2+h3.

A threshold of the comprehensive quantization index of the OTN network is defined as follows: index$_{threshold}$= (index$_{1threshold}$,index$_{2threshold}$, ... index$_{mthreshold}$), each element in index$_{threshold}$ represents an index threshold vector of each service, the index threshold vector of the i-th service may be defined as: index$_{threshold}$=(index$_{1threshold}$, index$_{2threshold}$, ... index$_{mthreshold}$).

The score of the quantitation index of each alternative resource route of each service may be divided into three cases:

a. in a case where a value index$_{ijk}$ of the quantization index is inversely proportional to a score w$_{ijh1}$ of the quantization index, a relationship between the value index of the quantization index and the score w$_{ijh1}$ of the quantization index is represented in a form of a reciprocal sum:

$$w_{ijh1} = \sum_{k=1}^{h1} \frac{\frac{1}{\text{index}_{ijk}}}{\text{index}_{ikthreshold}} \cdot \theta_{ik},$$

index$_{ijk}$ is the k-th quantization index of the j-th alternative resource route of the i-th service, index$_{ikthreshold}$ is a threshold of the k-th quantization index of the i-th service, the smaller the value index$_{ijk}$ of the first class of quantization index is, the higher the score w$_{ijh1}$ of the first class of quantization index corresponding to the alternative route is;

b. in a case where the value index$_{ijk}$ of the quantization index is proportional to the score w$_{ijh2}$ of the quantization index, a relationship between the value index$_{ijk}$ of the quantization index and the score w$_{ijh2}$ of the quantization index may be represented as:

$$w_{ijh2} = \sum_{k=h1+1}^{h1+1+h2} \frac{\text{index}_{ijk}}{\text{index}_{ikthreshold}} \cdot \theta_{ik};$$

c. only in a case where the i-th service is the last created service in an Episode, the value index$_{ijk}$ of the quantization index of the score w$_{ijh3}$ is obtained, a relationship between the value index$_{ijk}$ and the score w$_{ijh3}$ may be represented as:

$$w_{ijh3} = \sum_{k=h1+h2+1}^{h1+h2+1+h3} \{[!(m-i)] \cdot f(\text{index}_{ijk}, \text{index}_{ikthreshold}) \cdot \theta_{ik}\},$$

$\text{index}_{ijk}$ is the k-th quantization index of the j-th alternative resource route of the i-th service, $\text{index}_{ikthreshold}$ is a threshold of the k-th quantization index of the i-th service, !(m-i) is a logic non-operation of (m-i), $f(\text{index}_{ijk}, \text{index}_{ikthreshold}) \cdot \theta_{ik}$ is an index scoring function of the k-th quantization index of the j-th alternative resource route of the i-th service, and is expected to be proportional to an optimization degree of the quantitation index.

A greed coefficient of the j-th alternative resource route of i-th service is $$\xi_{ij} = \frac{w_{ij}}{\sum_{j=1}^{i_n} w_{ij}},$$

$i_n$ is a number of alternative routes of the i-th service.

A number of created services in the service creating state $S_t$ is set as t, a probability of selecting a service to be created is $$\frac{1}{m-t},$$

m is a total number of services to be created in the OTN network, a probability of selecting each service to be created is $$\frac{1}{m-t},$$

and an action policy $\pi_\theta(s,a)$ of each alternative route is $$\frac{\xi_{ij}}{m-t}.$$

In a third case, all services share a same evaluation system for evaluating the quantitation index and a sequence weight of each service is considered.

A number of services, to be created, of the OTN network is set to be m, the whole evaluation system for evaluating the quantitation index is represented by an index weight vector $\theta$, $\theta = (\theta_1, \theta_2, \ldots, \theta_m, \theta_{m+1}, \ldots \theta_{m+h})$, $\theta_1, \ldots \theta_m$ are sequence weights of the services, $\theta_{m+1}, \ldots \theta_{m+h}$ are index weights for comprehensively evaluating the OTN network, m is a number of services, to be created, of the OTN network, h is a total number of quantitation indexes, h=h1+h2+h3.

A threshold of the comprehensive quantitation index of the OTN network is defined as follows: $\text{index}_{threshold} = (\text{index}_{1threshold}, \text{index}_{2threshold}, \ldots \text{index}_{hthreshold})$.

The score of the quantitation index of each alternative resource route of each service may be divided into three cases according to a classification of quantitation indexes:

a. in a case where a value $\text{index}_{ijk}$ of the quantization index is inversely proportional to a score $w_{ijh1}$ of the quantization index, a relationship between the value $\text{index}_{ijk}$ of the quantization index and the score $w_{ijh1}$ of the quantization index is represented in a form of a reciprocal sum:

$$w_{ijh1} = \sum_{k=1}^{h1} \frac{1}{\frac{\text{index}_{ijk}}{\text{index}_{kthreshold}}} \cdot \theta_{m+k};$$

b. in a case where the value $\text{index}_{ijk}$ of the quantization index is proportional to the score $w_{ijh2}$ of the quantization index, a relationship between the value $\text{index}_{ijk}$ of the quantization index and the score $w_{ijh2}$ of the quantization index may be represented as:

$$w_{ijh2} = \sum_{k=h1+1}^{h1+1+h2} \frac{\text{index}_{ijk}}{\text{index}_{kthreshold}} \cdot \theta_{m+k};$$

c. only in a case where the i-th service is the last created service in an Episode, the value $\text{index}_{ijk}$ of the quantization index of the score $w_{ijh3}$ is obtained, a relationship between the value $\text{index}_{ijk}$ and the score $w_{ijh3}$ may be represented as:

$$w_{ijh3} = \sum_{k=h1+h2+1}^{h1+h2+1+h3} \{[!(m-i)] \cdot f(\text{index}_{ijk}, \text{index}_{kthreshold}) \cdot \theta_{m+k}\};$$

$\text{index}_{ijk}$ is the k-th quantization index of the j-th alternative resource route of the i-th service, $\text{index}_{kthreshold}$ is a threshold of the k-th quantization index, !(m-i) is a logic non-operation of (m-i), $f(\text{index}_{ijk}, \text{index}_{kthreshold}) \cdot \theta_{m+k}$ is an index scoring function of the k-th quantization index of the j-th alternative resource route of the i-th service.

A greed coefficient of the j-th alternative resource route of the i-th service is $$\xi_{ij} = \frac{w_{ij}}{\sum_{j=1}^{i_n} w_{ij}},$$

$i_n$ is a number of alternative routes of the i-th service.

The action policy $\pi_\theta(s,a)$ is calculated by following formula:

$$\pi_\theta(s, a) = \frac{\theta_i \cdot \xi_{ij}}{\sum_{r=1}^{m-t} \theta_k} \{\theta_i, \theta_k \notin N_t\},$$

$\xi_{ij}$ is the greed coefficient of the j-th alternative resource route of the i-th service, $$\frac{\theta_i}{\sum_{r=1}^{m-t} \theta_k}$$

is a probability of selecting a service i, to be created, with the sequence weight $\theta_i$, a number of services, to be created, of the state $S_t$ is (m-t), t is a number of created services, $\{\theta_i, \theta_k \notin N_t\}$ is a set of sequence weights of the services to be created, and $N_t$ is a set of sequence weights of the created services.

In a fourth case, each service has its own evaluation system for evaluating the quantitation index and a sequence weight of each service is considered.

A number of services, to be created, of the OTN network is set to be m, the whole evaluation system for evaluating the quantitation index is represented by an index weight vector$\theta$, $\theta = (\theta_1, \theta_2, \ldots \theta_m)$, $\theta_i = (\theta_{i0}, \theta_{i1}, \theta_{i2}, \ldots, \theta_{ih})$, $\theta_{i0}$ is a sequence weight of the i-th service, $\theta_{i1}, \ldots \theta_{ih}$ are index weights of the i-th service, m is a number of services, to be created, of the OTN network, h is a total number of quantitation indexes, h=h1+h2+h3.

A threshold of the comprehensive quantization index of the OTN network is defined as follows: $\text{index}_{threshold} = (\text{index}_{1threshold}, \text{index}_{2threshold}, \ldots \text{index}_{mthreshold})$.

The score of the quantitation index of each alternative resource route of each service may be divided into three cases according to a classification of quantitation indexes.

a. in a case where a value $\text{index}_{ijk}$ of the quantization index is inversely proportional to a score $w_{ijh1}$ of the quantization index, a relationship between the value $\text{index}_{ijk}$ of the quantization index and the score $w_{ijh1}$ of the quantization index is represented in a form of a reciprocal sum:

$$w_{ijh1} = \sum_{k=1}^{h1} \frac{1}{\frac{\text{index}_{ijk}}{\text{index}_{ikthreshold}}} \cdot \theta_{ik};$$

b. in a case where the value $\text{index}_{ijk}$ of the quantization index is proportional to the score $w_{ijh2}$ of the quantization index, a relationship between the value $\text{index}_{ijk}$ of the quantization index and the score $w_{ijh2}$ of the quantization index may be represented as:

$$w_{ijh2} = \sum_{k=h1+1}^{h1+1+h2} \frac{\text{index}_{ijk}}{\text{index}_{ikthreshold}} \cdot \theta_{ik};$$

c. only in a case where the i-th service is the last created service in an Episode, the value $\text{index}_{ijk}$ of the quantization index of the score $w_{ijh3}$ is obtained, a relationship between the value $\text{index}_{ijk}$ and the score $w_{ijh3}$ may be represented as:

$$w_{ijh3} = \sum_{k=h1+h2+1}^{h1+h2+1+h3} \{[!(m-i)] \cdot f(\text{index}_{ijk}, \text{index}_{ikthreshold}) \cdot \theta_{ik}\};$$

$\text{index}_{ijk}$ is the k-th quantization index of the j-th alternative resource route of the i-th service, $\text{index}_{ikthreshold}$ is a threshold of the k-th quantization index of the i-th service, !(m-i) is a logic non-operation of (m-i), $f(\text{index}_{ijk}, \text{index}_{ikthreshold}) \cdot \theta_{ik}$ is an index scoring function of the k-th quantization index of the j-th alternative resource route of the i-th service.

A greed coefficient of the j-th alternative resource route of the i-th service is $$\xi_{ij} = \frac{w_{ij}}{\sum_{j=1}^{i_n} w_{ij}},$$

$i_n$ is a number of alternative routes of the i-th service.

The action policy $\pi_\theta(s,a)$ is calculated by following formula:

$$\pi_\theta(s, a) = \frac{\theta_{i0} \cdot \xi_{ij}}{\sum_{r=1}^{m-t} \theta_{k0}} \{\theta_i, \theta_k \notin N_t\},$$

$\xi_{ij}$ is the greed coefficient of the j-th alternative resource route of the i-th service, $$\frac{\theta_{i0}}{\sum_{r=1}^{m-t} \theta_{k0}}$$

is a probability of selecting a service i, to be created, with the sequence weight $\theta_{i0}$, a number of services, to be created, of the state $S_t$ is (m-t), t is a number of created services, $\{\theta_i, \theta_k \notin N_t\}$ is a set of sequence weights of the services to be created, and $N_t$ is a set of sequence weights of the created services.

Figure 2:
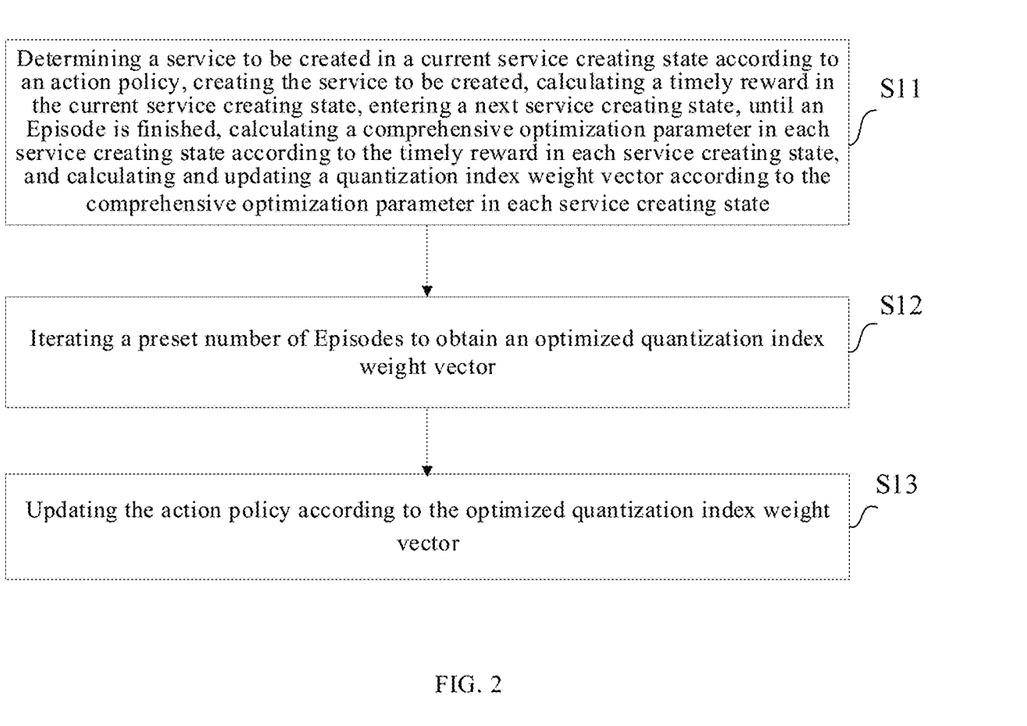
FIG. 2 is a flowchart of optimizing OTN network resources according to the present disclosure.

The present disclosure provides a method for optimizing OTN network resources, and as shown in FIG. 2, the method includes following operations S11 to S13.

At operation S11, determining a service to be created in a current service creating state according to an action policy, creating the service to be created, calculating a timely reward in the current service creating state, entering a next service creating state, until an Episode is finished, calculating a comprehensive optimization parameter in each service creating state according to the timely reward in each service creating state, and calculating and updating a quantization index weight vector according to the comprehensive optimization parameter in each service creating state.

As described above, the action policy is a probability function related to the quantization index weight vector, and the quantization index weight vector corresponds to a plurality of quantization indexes.

In operation S11, in each Episode, a service to be created (including a route of the service to be created) is determined according to the action policy, after the service is created, a timely reward in the current service creating state is calculated, and in response to that the current service creating state is finished, a next service crating state is entered. According to the above, for each service creating state in the Episode, the service to be created is created, and the timely reward in the corresponding service creating state is calculated, and until the Episode is finished, the comprehensive optimization parameter in each service creating state is calculated and updated according to the timely reward in each service creating state.

In operation S11, the comprehensive optimization parameter may be calculated and updated by adopting different algorithms, it should be noted that the comprehensive optimization parameter may be different according to the adopted algorithm, and various algorithms are described in detail below.

At operation S12, iterating a preset number of Episodes to obtain an optimized/desired/resultant quantization index weight vector.

In operation S12, operation S11 is repeated, the preset number of Episodes are iterated, and the comprehensive optimization parameter in each creating service state in each Episode is calculated and updated. Through operation S12, optimized/desired comprehensive optimization parameters in all service creating states corresponding to all services to be created in the OTN network can be obtained, thereby the optimized/desired/resultant quantization index weight vector is obtained.

At operation S13, updating the action policy according to the optimized/desired/resultant quantization index weight vector.

The comprehensive optimization parameter is used for representing the service creating state $S_t$ and the action $a_t$, after the optimized/desired comprehensive optimization parameter in a certain service creating state is determined, an optimized/desired action $a_t$ in the service creating state is determined, the optimized/desired action $a_t$ is an action for creating an optimized/desired service, to be created, in the service creating state, so that the optimized/desired service to be created (including a route of the service) in the service creating state can be determined, and services, to be created, sequenced according to service creating states can be obtained, a sequence of the services to be created is an optimized/desired action policy.

The method for optimizing OTN network resources provided by the present disclosure includes: determining a service to be created in a current service creating state according to an action policy, creating the service to be created, calculating a timely reward in the current service creating state, entering a next service creating state, until an Episode is finished, calculating a comprehensive optimization parameter in each service creating state according to the timely reward in each service creating state, and calculating and updating a quantization index weight vector according to the comprehensive optimization parameter in each service creating state, where the action policy is a probability function related to the quantization index weight vector, and the quantization index weight vector corresponds to a plurality of quantization indexes; iterating a preset number of Episodes to obtain an optimized/desired/resultant quantization index weight vector; and updating the action policy according to the optimized/desired/resultant quantization index weight vector. The present disclosure uses a reward-punishment mechanism of the algorithm of reinforcement learning to optimize the sequence of creating OTN network services, so that the obtained action policy has good convergence, preciseness and reliability, the problem of optimizing the OTN network resources is simplified to the problem of sequence of creating OTN network services, in addition, a parameter vector is introduced into the design of the action policy of reinforcement learning, and the optimized/desired action policy is obtained through adjusting the parameter vector, so as to realize a global optimization on the OTN network resources.

In some implementations, the comprehensive optimization parameter may be a state-action value $Q^{\pi_\theta}(s,a)$, $$Q^{\pi_\theta}(s, a) = E_{\pi_\theta}\left[\sum_{k=0}^{\infty}\gamma^k R_{t+k+1} \mid s = s_t, a = a_t\right],$$

which represents an expectation of a cumulative return obtained by starting from a state S and after taking an action a according to a policy $\pi_\theta$, $\gamma$ is a discount coefficient, $0<\gamma<1$; R is the timely reward, t is a number of created services in a service creating state $S_t$, t=(0, . . . ,m), m is a total number of services to be created in the OTN network.

In some implementations, the comprehensive optimization parameter may also be a state value $V_{\pi_\theta}(s)$, $$V_{\pi_\theta}(s) = \sum_{a \in A}\pi(a \mid s)Q_{\pi_\theta}(s, a),$$

which represents a weighted sum of all state-action values $Q_{\pi_\theta}(s,a)$ in a state S, $\pi_\theta(a|s)$ is a probability of taking the action a according to the action policy $\pi_\theta(a|s)$ in the service creating state S, a is a set of actions to be executed in each service creating state.

In a case where the comprehensive optimization parameter is the state-action value $Q^{\pi_\theta}(s,a)$, the calculating and updating a quantization index weight vector according to the comprehensive optimization parameter in each service creating state includes: calculating and updating the quantization index weight vector according to a neural network model, a gradient of the action policy and the state-action value $Q^{\pi_\theta}(s,a)$, by adopting an actor-critic algorithm.

In some implementations, a parameter vector $\omega$ of a neural network layer is trained according to an eigenvector function of the state S and the action a, a function $Q_\omega(s,a)$ of parameterized state-action values, and a neural network model, i.e., the eigenvector function $\varphi(s,a)$ of the state S and the action a is used as an input of the neural network model, the function $Q_\omega(s,a)$ of the parameterized state-action values is used as an output of the neural network model, so that the parameter vector $\omega$ of the neural network layer is trained, the $Q_\omega(s,a)$ is obtained according to the $Q_{\pi_\theta}(s,a)$, i.e., $Q_\omega(s,a) \approx Q_{\pi_\theta}(s,a)$, $Q_\omega(s,a)=\varphi(s,a)^T \cdot \omega$. The state-action value $Q_{\pi_\theta}(s,a)$ is updated according to the parameter vector $\omega$ of the neural network layer, and the index weight vector $\theta$ is updated according to the state-action value $Q_{\pi_\theta}(s,a)$ and the gradient of the action policy.

In a case where the comprehensive optimization parameter is the state value $V_{\pi_\theta}(s,a)$, the calculating and updating a quantization index weight vector according to the comprehensive optimization parameter in each service creating state includes: calculating and updating the quantization index weight vector according to the gradient of the action policy and the state value $V_{\pi_\theta}(s)$, by adopting a policy gradient (PG) algorithm.

Figure 3:
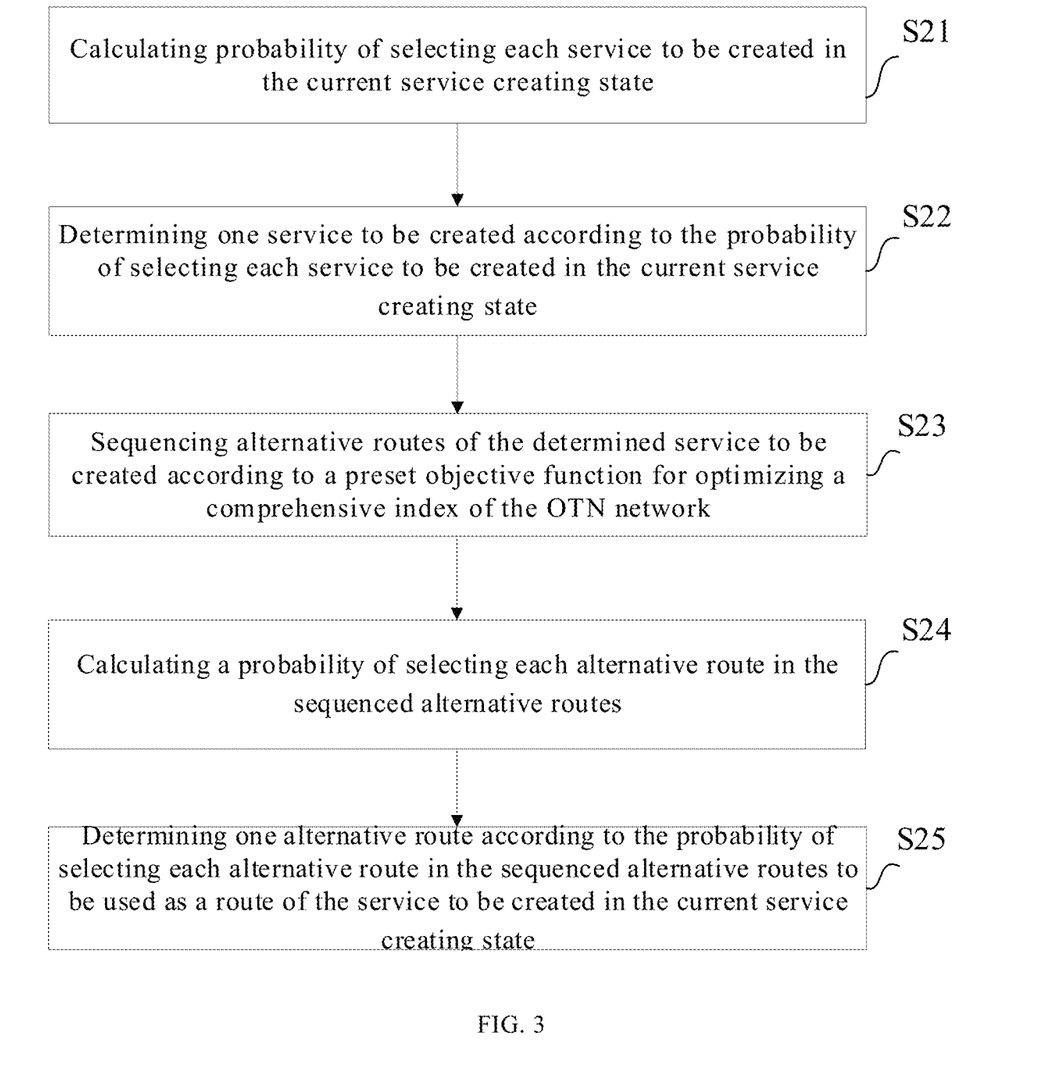
FIG. 3 is a flowchart of determining a service to be created in a current service creating state according to the present disclosure.

In some implementations, as shown in FIG. 3, the determining a service to be created in a current service creating state according to an action policy includes following operations S21 to S25.

At operation S21, calculating a probability of selecting each service to be created in the current service creating state.

In operation S21, a corresponding algorithm is determined according to a selected evaluation system for evaluating the quantitation index, probabilities of selecting each service to be created in different evaluation systems for evaluating the quantitation index are as described above, and thus are not repeated again.

At operation S22, determining one service to be created according to the probability of selecting each service to be created in the current service creating state.

It should be noted that based on an exploration concept of reinforcement learning, a selection of the service to be created follows a randomness of the policy.

At operation S23, sequencing alternative routes of the determined service to be created according to a preset objective function for optimizing a comprehensive index of the OTN network.

The objective function for optimizing the comprehensive index of the OTN network is a maximum reward $w_i$ of a comprehensive quantization index of resources occupied by the OTN network.

At operation S24, calculating a probability of selecting each alternative route in the sequenced alternative routes.

At operation S25, determining one alternative route according to the probability of selecting each alternative route in the sequenced alternative routes to be used as a route of the service to be created in the current service creating state.

In some implementations, the reward $w_i$ of the comprehensive quantization index of resources occupied by the OTN network is calculated according to a following formula: $w_i = w_{ih1} + w_{ih2} + w_{ih3}$, $w_{ih1}$ is a sum of rewards of the first class of quantization indexes, $$w_{ih1} = \sum_{k=1}^{h1} \frac{1}{\frac{index_{ik}}{index_{kthreshold}}} \cdot \lambda_k;$$

$w_{ih2}$ is a sum of rewards of the second class of quantitation indexes, $$w_{ih2} = \sum_{k=h1+1}^{h1+1+h2} \frac{index_{ik}}{index_{kthreshold}} \cdot \lambda_k;$$

$w_{ih3}$ is a sum of rewards of the third class of quantitation indexes, $$w_{ih3} = \sum_{k=h1+h2+1}^{h1+h2+1+h3} \{[! (m-i)] \cdot f(index_{ik}, index_{kthreshold}) \cdot \lambda_k\};$$

$\lambda$ is a reward coefficient vector of the quantitation index, $\lambda = (\lambda_1, \lambda_2, \ldots, \lambda_h)$, h is a total number of the quantitation indexes, $h = h1 + h2 + h3$.

$R_{t+1}$ is a timely reward obtained by taking an action $a_t$ in a state $S_t$, $R_{t+1} = w_{t+1}$, i.e., is equal to a reward of the comprehensive quantitation index of the (t+1)-th service, the higher a value of the reward is, the higher $R_{t+1}$ is. In a state $S_0$, the timely reward $R_0 = 0$.

Figure 4:
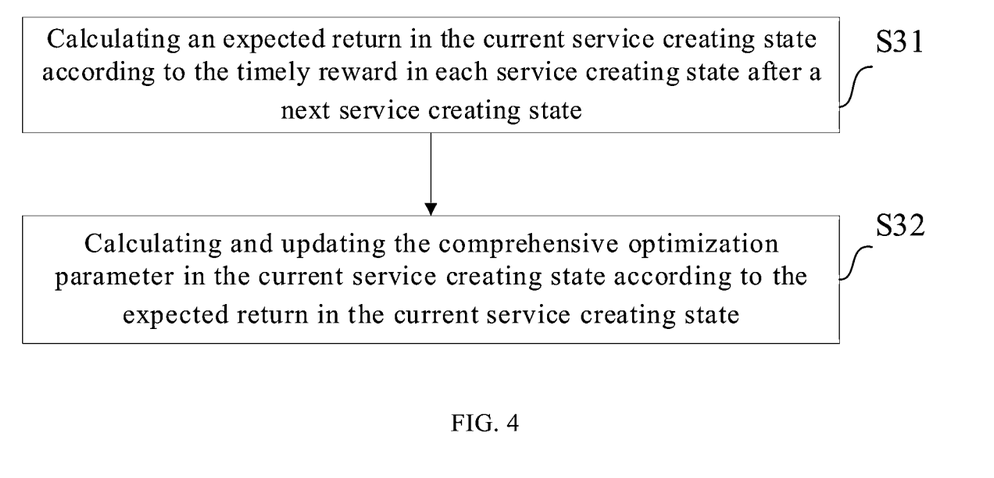
FIG. 4 is a schematic flowchart of calculating a comprehensive optimization parameter according to the present disclosure.

In some implementations, as shown in FIG. 4, the calculating and updating a comprehensive optimization parameter in each service creating state according to the timely reward in each service creating state includes following operations S31 and S32.

At operation S31, calculating an expected return in the current service creating state according to the timely reward in each service creating state after a next service creating state.

In some implementations, the expected return in the current service creating state may be calculated by a following formula:

$$G_t = \sum_{k=0}^{n-(t+1)} \gamma^k R_{t+k+1},$$

$G_t$ is the expected return of taking an action $a_t$ in a state $S_t$, $\gamma$ is a discount coefficient, $0 < \gamma < 1$; $R_{t+1}$ is a timely reward obtained by taking the action $a_t$ in the state $S_t$, $R_{t+1} = w_{t+1}$, t is a number of created services in the service creating state $S, t = (0, \ldots, m)$, m is a total number of services to be created in the OTN network.

It should be noted that expected return in the last service creating state is the timely reward in the service creating state.

At operation S32, calculating and updating the comprehensive optimization parameter in the current service creating state according to the expected return in the current service creating state.

Through operations S31 and S32, an optimization of the comprehensive optimization parameter is achieved by using a reward-punishment mechanism of the algorithm of reinforcement learning.

Processes of optimizing OTN network resources by using a Q-Based actor-critic algorithm and a PG algorithm are respectively described below.

(1) The process for optimizing OTN network resources by adopting the Q-Based actor-critic algorithm includes followings:

--- initializing a whole network topology environment, including initializing
$s \in S$, and a policy parameter vector $\theta$ ;
    initializing a sampling action $a \sim \pi_\theta$ according to a policy;
    setting $Q_\omega (s,a) = \phi(s,a)^T \omega$ ,
    For each operation of a sampling action, do:
        sampling the timely reward $r = R_s^a$ ; transferring by adopting a next state
$s' \sim P_s^a$ ;
        sampling a next action according to the policy $a' \sim \pi_\theta(s', a')$ ;
        $\delta = r + \gamma Q_\omega(s', a') - Q_\omega (s, a)$;
        $\theta = \theta + \alpha V_\theta \log \pi_\theta(s, a) Q_\omega (s, a)$;
        $\omega \leftarrow \omega + \beta \delta \phi(s, a)$;
        $a \leftarrow a'$ , $s \leftarrow s'$;
    End for;
End.

(2) The process for optimizing OTN network resources by adopting the PG algorithm:

```
initializing the whole network topology environment, for all s ∈ S,a ∈ A(s) ,
Q(s,a)←0;
   initializing θ ;
   For {s1,a1,r2,...,s_{T-1},a_{T-1},r_T} ~ π_θ in each Episode, each operation repeat
following processing, do:
   For t = 1 to T −1 do
      θ ← θ +α∇_θ logπ_θ(s_t,a_t)v_t ;
   End for;
   End for;
   returning θ , and updating the policy π_θ (s,a) .
```

Figure 5:
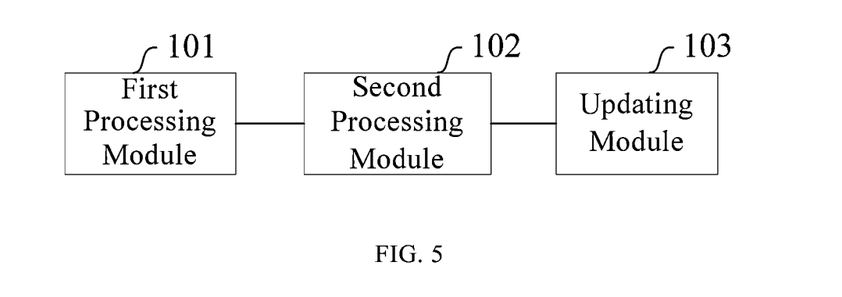
FIG. 5 is a schematic structural diagram of an apparatus for optimizing OTN network resources according to the present disclosure.

Based on the same technical concept, the present disclosure further provides an apparatus for optimizing OTN network resources, and as shown in FIG. 5, the apparatus includes a first processing module 101, a second processing module 102 and an updating module 103.

The first processing module 101 is configured to determine a service to be created in a current service creating state according to an action policy, create the service to be created, calculate a timely reward in the current service creating state, enter a next service creating state, until an Episode is finished, calculate a comprehensive optimization parameter in each service creating state according to the timely reward in each service creating state, and calculate and update a quantization index weight vector according to the comprehensive optimization parameter in each service creating state, where the action policy is a probability function related to the quantization index weight vector, and the quantization index weight vector corresponds to a plurality of quantization indexes.

The second processing module 102 is configured to iterate a preset number of Episodes to obtain an optimized/desired/resultant quantization index weight vector.

The updating module 103 is configured to update the action policy according to the optimized/desired/resultant quantization index weight vector.

In some implementations, the first processing module 101 is further configured to calculate a score of the comprehensive quantization index according to a plurality of quantization indexes and the quantization index weight vector; calculate a greed coefficient according to the score of the comprehensive quantization index; and determine the action policy according to the probability of selecting the service to be created and the greed coefficient.

In some implementations, the quantization indexes include a first class of quantization indexes, a second class of quantization indexes and a third class of quantization indexes, values of the first class of quantization indexes are inversely proportional to scores of the first class of quantization indexes, values of the second class of quantization indexes are inversely proportional to scores of the second class of quantization indexes, and scores of the third class of quantization indexes are obtained after creating the last service in each Episode.

The score $w_{ij}$ of the comprehensive quantization index is a sum of a sum $w_{ijh1}$ of the scores of the first class of quantization indexes, a sum $w_{ijh2}$ of the scores of the second class of quantization indexes and a sum $w_{ijh3}$ of the scores of the third class of quantization indexes, where h1 is a number of the first class of quantization indexes, h2 is a number of the second class of quantization indexes, h3 is a number of the third class of quantization indexes.

In some implementations, the first processing module 101 is further configured to calculate the greed coefficient according to a following formula:

$$\xi_{ij} = \frac{w_{ij}}{\sum_{j=1}^{i_n} w_{ij}};$$

$\xi_{ij}$ is a greed coefficient of a j-th alternative resource route of an i-th service, $w_{ij}$ is the score of the comprehensive quantization index, $i_n$ is a number of alternative routes of the i-th service.

In some implementations, the quantization index weight vector is $\theta=(\theta_1,\theta_2, \ldots ,\theta_h)$, h is a total number of the quantization indexes, h=h1+h2+h3; the first processing module 101 is further configured to calculate the sum $w_{ijh1}$ of the scores of the first class of quantization indexes according to a following formula:

$$w_{ijh1} = \sum_{k=1}^{h1} \frac{1}{\frac{\text{index}_{ijk}}{\text{index}_{kthreshold}}} \cdot \theta_k;$$

calculate the sum $w_{ijh2}$ of the scores of the second class of quantization indexes according to a following formula:

$$w_{ijh2} = \sum_{k=h1+1}^{h1+1+h2} \frac{\text{index}_{ijk}}{\text{index}_{kthreshold}} \cdot \theta_k;$$

calculate the sum $w_{ijh3}$ of the scores of the third class of quantization indexes according to a following formula:

$$w_{ijh3} = \sum_{k=h1+h2+1}^{h1+h2+1+h3} \{[! (m-i)] \cdot f(\text{index}_{ijk}, \text{index}_{kthreshold}) \cdot \theta_k\};$$

$\text{index}_{ijk}$ is a k-th quantization index of the j-th alternative resource route of the i-th service, $\text{index}_{kthreshold}$ is a threshold of the k-th quantization index, !(m-i) is a logic non-operation of (m-i), $f(\text{index}_{ijk},\text{index}_{kthreshold})\cdot\theta_k$ is an index scoring function of the k-th quantization index of the j-th alternative resource route of the i-th service; calculate the action policy $\pi_\theta(s,a)$ according to a following formula:

$$\pi_\theta(s, a) = \frac{\xi_{ij}}{m-t};$$

$\xi_{ij}$ is a greed coefficient of the j-th alternative resource route of the i-th service, $$\frac{1}{m-t}$$

is the probability of selecting the service to be created, t is a number of created services in a service creating state $S_t$, and m is a total number of services to be created in the OTN network.

In some implementations, the quantization index weight vector is $\theta=(\theta_1,\theta_2,\ldots\theta_m), \theta_i=(\theta_{i1},\theta_{i2},\ldots,\theta_{ih})$, h is a total number of the quantization indexes, h=h1+h2+h3; the sum $w_{ijh1}$ of the scores of the first class of quantization indexes is calculated according to a following formula:

$$w_{ijh1} = \sum_{k=1}^{h1} \frac{1}{\frac{\text{index}_{ijk}}{\text{index}_{kthreshold}}} \cdot \theta_{ik};$$

the sum $w_{ijh2}$ of the scores of the second class of quantization indexes is calculated according to a following formula:

$$w_{ijh2} = \sum_{k=h1+1}^{h1+1+h2} \frac{\text{index}_{ijk}}{\text{index}_{ikthreshold}} \cdot \theta_{ik};$$

the sum $w_{ijh3}$ of the scores of the third class of quantization indexes is calculated according to a following formula:

$$w_{ijh3} = \sum_{k=h1+h2+1}^{h1+h2+1+h3} \{[!\,(m-i)] \cdot f(\text{index}_{ijk}, \text{index}_{ikthreshold}) \cdot \theta_{ik}\};$$

$\text{index}_{ijk}$ is a k-th quantization index of the j-th alternative resource route of the i-th service, $\text{index}_{ikthreshold}$ is a threshold of the k-th quantization index of the i-th service, !(m-i) is a logic non-operation of (m-i), $f(\text{index}_{ijk}, \text{index}_{kthreshold}) \cdot \theta_{ik}$ is an index scoring function of the k-th quantization index of the j-th alternative resource route of the i-th service; the action policy $\pi_\theta(s,a)$ is calculated according to a following formula:

$$\pi_\theta(s, a) = \frac{\xi_{ij}}{m-t};$$

wherein, $\xi_{ij}$ is a greed coefficient of the j-th alternative resource route of the i-th service, $$\frac{1}{m-t}$$

is the probability of selecting the service to be created, t is a number of created services in a service creating state $S_t$, and m is a total number of services to be created in the OTN network.

In some implementations, the quantization index weight vector is $\theta=(\theta_1,\theta_2,\ldots,\theta_m,\theta_{m+1},\ldots\theta_{m+h})$, m is a total number of services to be created in the OTN network, h is a total number of the quantization indexes, h=h1+h2+h3; the first processing module 101 is further configured to calculate the sum $w_{ijh1}$ of the scores of the first class of quantization indexes according to a following formula:

$$w_{ijh1} = \sum_{k=1}^{h1} \frac{1}{\frac{\text{index}_{ijk}}{\text{index}_{kthreshold}}} \cdot \theta_{m+k};$$

calculate the sum $w_{ijh2}$ of the scores of the second class of quantization indexes according to a following formula:

$$w_{ijh2} = \sum_{k=h1+1}^{h1+1+h2} \frac{\text{index}_{ijk}}{\text{index}_{kthreshold}} \cdot \theta_{m+k};$$

calculate the sum $w_{ijh3}$ of the scores of the third class of quantization indexes according to a following formula:

$$w_{ijh3} = \sum_{k=h1+h2+1}^{h1+h2+1+h3} \{[!\,(m-i)] \cdot f(\text{index}_{ijk}, \text{index}_{kthreshold}) \cdot \theta_{m+k}\};$$

$\text{index}_{ijk}$ is a k-th quantization index of the j-th alternative resource route of the i-th service, $\text{index}_{kthreshold}$ is a threshold of the k-th quantization index, !(m-i) is a logic nonoperation of (m-i) $f(\text{index}_{ijk},\text{index}_{kthreshold}) \cdot \theta_{m+k}$ is an index scoring function of the k-th quantization index of the j-th alternative resource route of the i-th service; calculate the action policy $\pi_\theta(s,a)$ according to a following formula:

$$\pi_\theta(s, a) = \frac{\theta_i \cdot \xi_{ij}}{\sum_{r=1}^{m-t} \theta_k} \{\theta_i, \theta_k \notin N_t\};$$

$\xi_{ij}$ is a greed coefficient of the j-th alternative resource route of the i-th service, $$\frac{\theta_i}{\sum_{r=1}^{m-t} \theta_k}$$

is a probability of selecting the service i, to be created, with a sequence weight $\theta_i$, (m-t) is a number of services to be created in a state $S_t$, t is a number of created services, $\{\theta_i,\theta_k \notin N_t\}$ is a set of sequence weights of the services to be created, $N_t$ is a set of sequence weights of the created services.

In some implementations, the quantization index weight vector is $\theta=(\theta_1,\theta_2,\ldots\theta_m)$, $\theta_i=(\theta_{i0},\theta_{i1},\theta_{i2},\ldots,\theta_{ih})$, m is a total number of services to be created in the OTN network, h is a total number of the quantization indexes, h=h1+h2+h3; the first processing module 101 is further configured to calculate the sum $w_{ijh1}$ of the scores of the first class of quantization indexes according to a following formula:

$$w_{ijh1} = \sum_{k=1}^{h1} \frac{\frac{1}{\text{index}_{ijk}}}{\text{index}_{ikthreshold}} \cdot \theta_{ik};$$

calculate the sum $w_{ijh2}$ of the scores of the second class of quantization indexes according to a following formula:

$$w_{ijh2} = \sum_{k=h1+1}^{h1+1+h2} \frac{\text{index}_{ijk}}{\text{index}_{ikthreshold}} \cdot \theta_{ik};$$

calculate the sum $w_{ijh3}$ of the scores of the third class of quantization indexes according to a following formula:

$$w_{ijh3} = \sum_{k=h1+h2+1}^{h1+h2+1+h3} \{[!(m-i)] \cdot f(\text{index}_{ijk}, \text{index}_{ikthreshold}) \cdot \theta_{ik}\};$$

$\text{index}_{ijk}$ is a k-th quantization index of the j-th alternative resource route of the i-th service, $\text{index}_{ikthreshold}$ is a threshold of the k-th quantization index of the i-th service, !(m-i) is a logic non-operation of (m-i), f($\text{index}_{ijk}$, $\text{index}_{kthreshold}$)·$\theta_{ik}$ is an index scoring function of the k-th quantization index of the j-th alternative resource route of the i-th service; calculate the action policy $\pi_\theta(s,a)$ according to a following formula:

$$\pi_\theta(s, a) = \frac{\theta_{i0} \cdot \xi_{ij}}{\sum_{r=1}^{m-t} \theta_{k0}} \{\theta_i, \theta_k \notin N_t\};$$

$\xi_{ij}$ is a greed coefficient of the j-th alternative resource route of the i-th service, $$\frac{\theta_{i0}}{\sum_{r=1}^{m-t} \theta_{k0}}$$

is a probability of selecting the service i, to be created, with a sequence weight $\theta_{i0}$, (m-t) is a number of services to be created in a state $S_t$, t is a number of created services, $\{\theta_i, \theta_k \notin N_t\}$ is a set of sequence weights of the services to be created, $N_t$ is a set of sequence weights of the created services.

In some implementations, the comprehensive optimization parameter includes a state-action value $Q^{\pi_\theta}(s,a)$, $$Q^{\pi_\theta}(s, a) = E_{\pi_\theta}\left[\sum_{k=0}^{\infty} \gamma^k R_{t+k+1} \mid s = s_t, a = a_t\right],$$

where $\gamma$ is a discount coefficient, $0<\gamma<1$; R is the timely reward, t is a number of created services in the state $S_t$, t=(0, . . . , m), m is a total number of services to be created in the OTN network; or the comprehensive optimization parameter includes a state value $V_{\pi_\theta}(s)$, $$V_{\pi_\theta}(s) = \sum_{a \in A} \pi(a \mid s) Q_{\pi_\theta}(s, a),$$

where $\pi_\theta(a|s)$ is a probability of executing the action a according to the action policy $\pi_\theta(a|s)$ in the service creating state S, a is a set of actions to be executed in each service creating state.

In some implementations, in response to that the comprehensive optimization parameter is the state-action value $Q^{\pi_\theta}(s,a)$, the updating module 103 is configured to calculate and update the quantization index weight vector according to a neural network model, a gradient of the action policy and the state-action value $Q^{\pi_\theta}(s,a)$, by adopting an actor-critic algorithm.

In some implementations, in response to that the comprehensive optimization parameters is the state value $V_{\pi_\theta}(s)$, the updating module 103 is configured to calculate and update the quantization index weight vector according to a gradient of the action policy and the state value $V_{\pi_\theta}(s)$, by adopting a policy gradient algorithm.

In some implementations, the first processing module 101 is further configured to calculate the probability of selecting each service to be created in the current service creating state; determine one service to be created according to the probability of selecting each service to be created in the current service creating state; sequence alternative routes of the determined service to be created according to a preset objective function for optimizing the comprehensive index of the OTN network; calculate the probability of selecting each alternative route in the sequenced alternative routes; and determine one alternative route according to the probability of selecting each alternative route in the sequenced alternative routes to be used as a route of the service to be created in the current service creating state.

In some implementations, the objective function for optimizing the comprehensive index of the OTN network is a maximum reward $w_i$ of the comprehensive quantization index of resources occupied by the OTN network.

In some implementations, the first processing module 101 is further configured to calculate the maximum reward $w_i$ of the comprehensive quantization index of resources occupied by the OTN network according to a following formula: $w_i = w_{ih1} + w_{ih2} + w_{ih3}$; $w_{ih1}$ is a sum of rewards of the first class of quantization indexes, $$w_{ih1} = \sum_{k=1}^{h1} \frac{\frac{1}{\text{index}_{ik}}}{\text{index}_{kthreshold}} \cdot \lambda_k;$$

$w_{ih2}$ is a sum of rewards of the second class of quantization indexes, $$w_{ih2} = \sum_{k=h1+1}^{h1+1+h2} \frac{\text{index}_{ik}}{\text{index}_{kthreshold}} \cdot \lambda_k;$$

$w_{ih3}$ is a sum of rewards of the third class of quantization indexes, $$w_{ih3} = \sum_{k=h1+h2+1}^{h1+h2+1+h3} \{[!(m-i)] \cdot f(\text{index}_{ik}, \text{index}_{kthreshold}) \cdot \lambda_k\};$$

λ is a reward coefficient vector of the quantization index, λ=($\lambda_1,\lambda_2, \ldots ,\lambda_h$), h is a total number of the quantization indexes, h=$h_1+h_2+h_3$.

In some implementations, the first processing module 101 is further configured to calculate an expected return in the current service creating state according to the timely reward in each service creating state after a next service creating state; and calculate and update the comprehensive optimization parameter in the current service creating state according to the expected return in the current service creating state.

In some implementations, the first processing module 101 is further configured to calculate the expected return in the current service creating state according to a following formula:

$$G_t = \sum_{k=0}^{n-(t+1)} \gamma^k R_{t+k+1};$$

$G_t$ is the expected return of executing the action $a_t$ in the service creating state $S_t$, γ is a discount coefficient, 0<γ<1; $R_{t+1}$ is a timely reward obtained by executing the action $a_t$ in the service creating state $S_t$, $R_{t+1}$=$w_{t+1}$, t is a number of created services in the service creating state $S_t$, t=(0, ..., m), m is a total number of services to be created in the OTN network.

The present disclosure further provides a computer device, including: at least one processor and a storage device having at least one program stored thereon, the at least one program, when executed by the at least one processor, causes the at least one processor to perform the method for optimizing OTN network resources described above.

The present disclosure further provides a computer-readable storage medium having a program stored thereon, the program, when executed by a processor, causes the processor to perform the method for optimizing OTN network resources described above.

It should be understood by those of ordinary skill in the art that all or some of the operations in the method, the functional modules/components in the apparatus disclosed above may be implemented as software, firmware, hardware, or suitable combinations thereof. In a hardware implementation, the division between the functional modules/components stated above does not correspond to the division of physical components; for example, one physical component may have a plurality of functions, or one function or operation may be performed through cooperation of several physical components. Some or all of the physical components may be implemented as software to be executed by a processor, such as a central processing unit, a digital signal processor or a microprocessor, or may be implemented as hardware, or may be implemented as an integrated circuit, such as an application specific integrated circuit. Such software may be distributed on a computer-readable medium, the computer-readable medium may include computer storage medium (or non-transitory medium) and communication medium (or transitory medium). The computer storage medium includes volatile/nonvolatile or removable/non-removable medium used in any method or technology for storing information (such as computer-readable instructions, data structures, program modules and other data). The computer storage medium includes, but is not limited to, a Random Access Memory (RAM), a Read-Only Memory (ROM), an Electrically Erasable Programmable Read-Only Memory (EEPROM), a flash memory or other memory techniques, a Compact Disc Read-Only Memory (CD-ROM), a Digital Video Disk (DVD) or other optical discs, magnetic cassettes, magnetic tapes, magnetic disks or other magnetic storage devices, or any other medium which can be used to store the desired information and can be accessed by a computer. The communication medium generally includes computer-readable instructions, data structures, program modules or other data in a modulated data signal, such as a carrier wave or other transmission mechanism, and may include any information delivery medium.

The present disclosure discloses the exemplary embodiments, and although specific terms are employed, they are used and should only be interpreted in a generic and descriptive meaning and not for purposes of a limitation. It is apparent to those skilled in the art that features, characteristics and/or elements described in connection with specific embodiments may be used alone or in combination with features, characteristics and/or elements described in connection with other embodiments, unless explicitly stated otherwise. Therefore, it should be understood by those skilled in the art that various changes in form and details may be made without departing from the scope of the present disclosure as set forth in the appended claims.

What is claimed is:

1. A method for optimizing network resources of an optical transport network (OTN), comprising:
   determining a service to be created and a resource route, already allocated with network resources, of the service to be created in a current service creating state according to an action policy, creating the service to be created, calculating a timely reward in the current service creating state, entering a next service creating state, until an Episode is finished, calculating a comprehensive optimization parameter in each service creating state according to the timely reward in each service creating state, and calculating and updating a quantization index weight vector according to the comprehensive optimization parameter in each service creating state, wherein the action policy is a probability function related to the quantization index weight vector, and the quantization index weight vector corresponds to a plurality of quantization indexes of the network resources;
   iterating a preset number of Episodes to obtain an optimized comprehensive optimization parameter in each service creating state, and obtain an optimized quantization index weight vector according to the optimized comprehensive optimization parameter; and
   updating the action policy according to the optimized quantization index weight vector.

2. The method of claim 1, further comprising:
   before determining the service to be created in the current service creating state according to the action policy, calculating a score of a comprehensive quantization index according to a plurality of quantization indexes and the quantization index weight vector;
   calculating a greed coefficient according to the score of the comprehensive quantization index; and
   determining the action policy according to a probability of selecting a service to be created and the greed coefficient.

3. The method of claim 2, wherein the quantization indexes comprise a first class of quantization indexes, a second class of quantization indexes and a third class of quantization indexes, wherein values of the first class of quantization indexes are inversely proportional to scores of the first class of quantization indexes, values of the second class of quantization indexes are inversely proportional to scores of the second class of quantization indexes, and scores of the third class of quantization indexes are obtained after creating a last service in each Episode;

the score $w_{ij}$ of the comprehensive quantization index is a sum of a sum $w_{ijh1}$ of the scores of the first class of quantization indexes, a sum $w_{ijh2}$ of the scores of the second class of quantization indexes and a sum $w_{ijh3}$ of the scores of the third class of quantization indexes, wherein h1 is a number of the first class of quantization indexes, h2 is a number of the second class of quantization indexes, h3 is a number of the third class of quantization indexes.

4. The method of claim 3, wherein the greed coefficient is calculated according to a following formula:

$$\xi_{ij} = \frac{w_{ij}}{\sum_{j=1}^{i_n} w_{ij}};$$

where $\xi_{ij}$ is a greed coefficient of a j-th alternative resource route of an i-th service, $w_{ij}$ is the score of the comprehensive quantization index, $i_n$ is a number of alternative resource routes of the i-th service.

5. The method of claim 4, wherein the quantization index weight vector is $\theta=(\theta_1,\theta_2,\ldots,\theta_h)$, h is a total number of the quantization indexes, h=h1+h2+h3;

calculating the sum $w_{ijh1}$ of the scores of the first class of quantization indexes according to a following formula:

$$w_{ijh1} = \sum_{k=1}^{h1} \frac{1}{\frac{index_{ijk}}{index_{kthreshold}}} \cdot \theta_k;$$

calculating the sum $w_{ijh2}$ of the scores of the second class of quantization indexes according to a following formula:

$$w_{ijh2} = \sum_{k=h1+1}^{h1+1+h2} \frac{index_{ijk}}{index_{kthreshold}} \cdot \theta_k;$$

calculating the sum $w_{ijh3}$ of the scores of the third class of quantization indexes according to a following formula:

$$w_{ijh3} = \sum_{k=h1+h2+1}^{h1+h2+1+h3} \{[!(m-i)] \cdot f(index_{ijk}, index_{kthreshold}) \cdot \theta_k\};$$

where $index_{ijk}$ is a k-th quantization index of the j-th alternative resource route of the i-th service, $index_{kthreshold}$ is a threshold of the k-th quantization index, !(m-i) is a logic non-operation of (m-i), $f(index_{ijk}, index_{kthreshold}) \cdot \theta_k$ is an index scoring function of the k-th quantization index of the j-th alternative resource route of the i-th service;

calculating the action policy $\pi_{74}(s,a)$ according to a following formula:

$$\pi_\theta(s,a) = \frac{\xi_{ij}}{m-t};$$

where $\xi_{ij}$ is a greed coefficient of the j-th alternative resource route of the i-th service, $$\frac{1}{m-t}$$

is the probability of selecting the service to be created, t is a number of created services in a service creating state $S_t$, and m is a total number of services to be created in the OTN.

6. The method of claim 4, wherein the quantization index weight vector is $\theta=(\theta_1,\theta_2,\ldots\theta_m)$, $\theta_i=(\theta_{i1},\theta_{i2},\ldots,\theta_{ih})$, h is a total number of the quantization indexes, h=h1+h2+h3;

calculating the sum $w_{ijh1}$ of the scores of the first class of quantization indexes according to a following formula:

$$w_{ijh1} = \sum_{k=1}^{h1} \frac{1}{\frac{index_{ijk}}{index_{ikthreshold}}} \cdot \theta_{ik};$$

calculating the sum $w_{ijh2}$ of the scores of the second class of quantization indexes according to a following formula:

$$w_{ijh2} = \sum_{k=h1+1}^{h1+1+h2} \frac{index_{ijk}}{index_{ikthreshold}} \cdot \theta_{ik};$$

calculating the sum $w_{ijh3}$ of the scores of the third class of quantization indexes according to a following formula:

$$w_{ijh3} = \sum_{k=h1+h2+1}^{h1+h2+1+h3} \{[!(m-i)] \cdot f(index_{ijk}, index_{ikthreshold}) \cdot \theta_{ik}\};$$

where $index_{ijk}$ is a k-th quantization index of the j-th alternative resource route of the i-th service, $index_{ikthreshold}$ is a threshold of the k-th quantization index of the i-th service, !(m-i) is a logic non-operation of (m-i), $f(index_{ijk}, index_{kthreshold}) \cdot \theta_{ik}$ is an index scoring function of the k-th quantization index of the j-th alternative resource route of the i-th service;

calculating the action policy $\pi_\theta(s,a)$ according to a following formula:

$$\pi_\theta(s,a) = \frac{\xi_{ij}}{m-t};$$

where $\xi_{ij}$ is a greed coefficient of the j-th alternative resource route of the i-th service, $$\frac{1}{m-t}$$

is the probability of selecting the service to be created, t is a number of created services in a service creating state $S_t$, and m is a total number of services to be created in the OTN.

7. The method of claim 4, wherein the quantization index weight vector is $\theta=(\theta_1,\theta_2,\ldots,\theta_m,\theta_{m+1},\ldots\theta_{m+h})$, m is a total number of services to be created in the OTN, h is a total number of the quantization indexes, h=h1+h2+h3;

calculating the sum $w_{ijh1}$ of the scores of the first class of quantization indexes according to a following formula:

$$w_{ijh1} = \sum_{k=1}^{h1} \frac{1}{\frac{\text{index}_{ijk}}{\text{index}_{kthreshold}}} \cdot \theta_{m+k};$$

calculating the sum $w_{ijh2}$ of the scores of the second class of quantization indexes according to a following formula:

$$w_{ijh2} = \sum_{k=h1+1}^{h1+1+h2} \frac{\text{index}_{ijk}}{\text{index}_{kthreshold}} \cdot \theta_{m+k};$$

calculating the sum $w_{ijh3}$ of the scores of the third class of quantization indexes according to a following formula:

$$w_{ijh3} = \sum_{k=h1+h2+1}^{h1+h2+1+h3} \{[!(m-i)] \cdot f(\text{index}_{ijk}, \text{index}_{kthreshold}) \cdot \theta_{m+k}\};$$

where $\text{index}_{ijk}$ is a k-th quantization index of the j-th alternative resource route of the i-th service, $\text{index}_{kthreshold}$ is a threshold of the k-th quantization index, !(m-i) is a logic nonoperation of (m-i), $f(\text{index}_{ijk}, \text{index}_{kthreshold}) \cdot \theta_{m+k}$ is an index scoring function of the k-th quantization index of the j-th alternative resource route of the i-th service;

calculating the action policy $\pi_\theta(s,a)$ according to a following formula:

$$\pi_\theta(s, a) = \frac{\theta_i \cdot \xi_{ij}}{\sum_{r=1}^{m-t} \theta_k} \{\theta_i, \theta_k \notin N_t\};$$

where $\xi_{ij}$ is a greed coefficient of the j-th alternative resource route of the i-th service, $$\frac{\theta_i}{\sum_{r=1}^{m-t} \theta_k}$$

is a probability of selecting a service i, to be created, with a sequence weight $\theta_i$, (m-t) is a number of services to be created in a state $S_t$, t is a number of created services, $\{\theta_i, \theta_k \notin N_t\}$ is a set of sequence weights of the services to be created, $N_t$ is a set of sequence weights of the created services.

8. The method of claim 4, wherein the quantization index weight vector is $\theta = (\theta_1, \theta_2, \ldots \theta_m)$, $\theta_i = (\theta_{i0}, \theta_{i1}, \theta_{i2}, \ldots, \theta_{ih})$, m is a total number of services to be created in the OTN, h is a total number of the quantization indexes, h=h1+h2+h3;

calculating the sum $w_{ijh1}$ of the scores of the first class of quantization indexes according to a following formula:

$$w_{ijh1} = \sum_{k=1}^{h1} \frac{1}{\frac{\text{index}_{ijk}}{\text{index}_{ikthreshold}}} \cdot \theta_{ik};$$

calculating the sum $w_{ijh2}$ of the scores of the second class of quantization indexes according to a following formula:

$$w_{ijh2} = \sum_{k=h1+1}^{h1+1+h2} \frac{\text{index}_{ijk}}{\text{index}_{ikthreshold}} \cdot \theta_{ik};$$

calculating the sum $w_{ijh}$ of the scores of the third class of quantization indexes according to a following formula:

$$w_{ijh3} = \sum_{k=h1+h2+1}^{h1+h2+1+h3} \{[!(m-i)] \cdot f(\text{index}_{ijk}, \text{index}_{ikthreshold}) \cdot \theta_{ik}\};$$

where $\text{index}_{ijk}$ is a k-th quantization index of the j-th alternative resource route of the i-th service, $\text{index}_{ikthreshold}$ is a threshold of the k-th quantization index of the i-th service, !(m-i) is a logic non-operation of (m-i), $f(\text{index}_{ijk}, \text{index}_{kthreshold}) \cdot \theta_{ik}$ is an index scoring function of the k-th quantization index of the j-th alternative resource route of the i-th service;

calculating the action policy $\pi_{74}(s,a)$ according to a following formula:

$$\pi_\theta(s, a) = \frac{\theta_{i0} \cdot \xi_{ij}}{\sum_{r=1}^{m-t} \theta_{k0}} \{\theta_i, \theta_k \notin N_t\};$$

where $\xi_{ij}$ is a greed coefficient of the j-th alternative resource route of the i-th service, $$\frac{\theta_{i0}}{\sum_{r=1}^{m-t} \theta_{k0}}$$

is a probability of selecting a service i, to be created, with a sequence weight $\theta_{i0}$, (m-t) is a number of services to be created in a state $S_t$, t is a number of created services, $\{\theta_i, \theta_k \notin N_t\}$ is a set of sequence weights of the services to be created, $N_t$ is a set of sequence weights of the created services.

9. The method of claim 1, wherein the comprehensive optimization parameter comprises a state-action value $Q^{\pi_\theta}(s,a)$, $$Q^{\pi_\theta}(s, a) = E_{\pi_\theta}\left[\sum_{k=0}^{\infty} \gamma^k R_{t+k+1} \,\bigg|\, s = s_t, a = a_t\right],$$

where γ is a discount coefficient, 0<γ≤1; R is the timely reward, t is a number of created services in the state $S_t$, t=(0, . . . , m), m is a total number of services to be created in the OTN; or the comprehensive optimization parameter comprises a state value $V_{\pi_\theta}(s)$, $$V_{\pi_\theta}(s) = \sum_{a \in A} \pi(a|s) Q_{\pi_\theta}(s, a),$$

where $\pi_\theta(a|s)$ is a probability of executing an action a according to the action policy $\pi_\theta(a|s)$ in the service creating state S, a is a set of actions to be executed in each service creating state.

10. The method of claim 9, wherein in response to that the comprehensive optimization parameter is the state-action value $Q^{\pi_\theta}(s,a)$, the calculating and updating a quantization index weight vector according to the comprehensive optimization parameter in each service creating state comprises:
  calculating and updating the quantization index weight vector according to a neural network model, a gradient of the action policy and the state-action value $Q^{\pi_\theta}(s,a)$, by adopting an actor-critic algorithm.

11. The method of claim 9, wherein in response to that the comprehensive optimization parameter is the state value $V_{\pi_\theta}(s)$, the calculating and updating a quantization index weight vector according to the comprehensive optimization parameters in each service creating state comprises:
  calculating and updating the quantization index weight vector according to a gradient of the action policy and the state value $V_{\pi_\theta}(s)$, by adopting a policy gradient algorithm.

12. The method of claim 3, wherein the determining a service to be created and a resource route, already allocated with network resources, of the service to be created in a current service creating state according to an action policy comprises:
  calculating a probability of selecting each service to be created in the current service creating state;
  determining one service to be created according to the probability of selecting each service to be created in the current service creating state;
  sequencing alternative resource routes of the determined service to be created according to a preset objective function for optimizing a comprehensive index of the OTN;
  calculating a probability of selecting each alternative resource route in the sequenced alternative resource routes; and
  determining one alternative resource route according to the probability of selecting each alternative resource route in the sequenced alternative resource routes to be used as the resource route of the service to be created in the current service creating state.

13. The method of claim 12, wherein the objective function for optimizing the comprehensive index of the OTN is a maximum reward $w_i$ of a comprehensive quantization index of resources occupied by the OTN.

14. The method of claim 13, wherein the maximum reward $w_i$ of the comprehensive quantization index of resources occupied by the OTN is calculated according to a following formula: $w_i = w_{ih1} + w_{ih2} + w_{ih3}$;

where $w_{ih1}$ is a sum of rewards of the first class of quantization indexes, $$w_{ih1} = \sum_{k=1}^{h1} \frac{1}{\frac{index_{ik}}{index_{kthreshold}}} \cdot \lambda_k;$$

$w_{ih2}$ is a sum of rewards of the second class of quantization indexes, $$w_{ih2} = \sum_{k=h1+1}^{h1+1+h2} \frac{index_{ik}}{index_{kthreshold}} \cdot \lambda_k;$$

$w_{ih3}$ is a sum of rewards of the third class of quantization indexes, $$w_{ih3} = \sum_{k=h1+h2+1}^{h1+h2+1+h3} \{[!(m-i)] \cdot f(index_{ik}, index_{kthreshold}) \cdot \lambda_k\};$$

λ is a reward coefficient vector of the quantization index, $\lambda = (\lambda_1, \lambda_2, \ldots, \lambda_h)$, h is a total number of the quantization indexes, h=h1+h2+h3.

15. The method of claim 3, wherein the calculating a comprehensive optimization parameter in each service creating state according to the timely reward in each service creating state comprises:
  calculating an expected return in the current service creating state according to the timely reward in each service creating state after a next service creating state; and
  calculating and updating the comprehensive optimization parameter in the current service creating state according to the expected return in the current service creating state.

16. The method of claim 15, wherein the expected return in the current service creating state is calculated according to a following formula:

$$G_t = \sum_{k=0}^{n-(t+1)} \gamma^k R_{t+k+1};$$

where $G_t$ is the expected return of executing an action $a_t$ in the service creating state $S_t$, γ is a discount coefficient, 0<γ≤1; $R_{t+1}$ is a timely reward obtained by executing the action $a_t$ in the service creating state $S_t$, $R_{t+1} = w_{t+1}$, t is a number of created services in the service creating state $S_t$, t=(0, . . . , m), m is a total number of services to be created in the OTN.

17. A computer device, comprising:
  at least one processor;
  a storage device having at least one program stored thereon;
  the at least one program, when executed by the at least one processor, causes the at least one processor to perform the method of claim 1.

18. A non-transitory computer-readable storage medium, having a computer program stored thereon, the computer program, when executed by a processor, causes the processor to perform the method of claim 1.

* * * * *

UNITED STATES PATENT AND TRADEMARK OFFICE
CERTIFICATE OF CORRECTION

PATENT NO. : 12,309,538 B2  
APPLICATION NO. : 18/023348  
DATED : May 20, 2025  
INVENTOR(S) : Dajiang Wang et al.

Page 1 of 1

It is certified that error appears in the above-identified patent and that said Letters Patent is hereby corrected as shown below:

In the Specification

Column 8, Lines 40, the formula reading -
$$w_{ijh1} = \sum_{k=1}^{h1} \frac{1}{\frac{index_{ijk}}{index_{ikthreshold}}} \cdot \theta_{ik},$$

Should read --
$$w_{ijh1} = \sum_{k=1}^{h1} \frac{1}{index_{ijk}} \cdot \theta_{ik}$$
$$index_{ikthreshold}$$
--

In the Claims

Column 25, Line 61, Claim 4, the parameter reading - $\pi_{74}(s, a)$ -  
Should read -- $\pi_\theta(s, a)$ --

Column 28, Line 34, Claim 8, the parameter reading - $\pi_{74}(s, a)$ -  
Should read -- $\pi_\theta(s, a)$ --

Signed and Sealed this  
Eighteenth Day of November, 2025

John A. Squires  
*Director of the United States Patent and Trademark Office*